United States Patent
Kobayashi

(10) Patent No.: US 6,519,481 B1
(45) Date of Patent: Feb. 11, 2003

(54) RADIO COMMUNICATION DEVICE HAVING UNDERLINING SCROLL DISPLAY FUNCTION

(75) Inventor: Yasuhiro Kobayashi, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/366,540

(22) Filed: Aug. 4, 1999

(30) Foreign Application Priority Data

Aug. 4, 1998 (JP) .......................................... 73-220432

(51) Int. Cl.$^7$ ............................................ H04B 1/38
(52) U.S. Cl. .................... 455/566; 455/90; 455/575; 379/93.17
(58) Field of Search ................. 455/566, 575, 455/550, 90, 564, 567; 379/93.17, 93.18; 345/829, 828, 830, 835

(56) References Cited

U.S. PATENT DOCUMENTS

| | | | | |
|---|---|---|---|---|
| 5,396,264 A | * | 3/1995 | Falcone et al. | 340/7.55 |
| 5,436,954 A | * | 7/1995 | Nishiyama et al. | 455/90 |
| 5,627,525 A | * | 5/1997 | Kudoh et al. | 340/7.55 |
| 5,761,610 A | * | 6/1998 | Sorensen et al. | 455/89 |
| 5,872,521 A | * | 2/1999 | Lopatukin et al. | 340/7.55 |
| 5,915,228 A | * | 6/1999 | Kunihiro et al. | 455/575 |
| 5,966,652 A | * | 10/1999 | Coad et al. | 455/566 |
| 6,125,273 A | * | 9/2000 | Yamagishi | 455/550 |
| 6,178,338 B1 | * | 1/2001 | Yamagishi et al. | 455/566 |
| 6,223,058 B1 | * | 4/2001 | Sudo et al. | 455/564 |
| 6,249,689 B1 | * | 6/2001 | Aizawa | 455/566 |

FOREIGN PATENT DOCUMENTS

| | | |
|---|---|---|
| JP | 8-79361 | 3/1996 |
| JP | 8-186852 | 7/1996 |
| JP | 9-261758 | 10/1997 |
| JP | 10-93678 | 4/1998 |
| JP | 10-155020 | 6/1998 |

* cited by examiner

Primary Examiner—Edward F. Urban
Assistant Examiner—Tilahun Gesesse
(74) Attorney, Agent, or Firm—Young & Thompson

(57) ABSTRACT

Upon receipt of a message in a state of waiting to receive the message, the received message is stored in a RAM, and a message receipt information is performed. When a user presses down a push switch for the message receipt information, the received message is displayed on a LCD. At this time, when it is impossible to display the received message on the LCD at a time because of the long received message, a jog switch is manipulated by a user. When the user manipulates the jog switch 12, the message displayed on the LCD is scrolled depending on the direction of rotation of the jog switch and the quantity of rotation thereof. Of the scrolled message, the portion of the message before scrolling is underlined and displayed on the LCD.

12 Claims, 13 Drawing Sheets

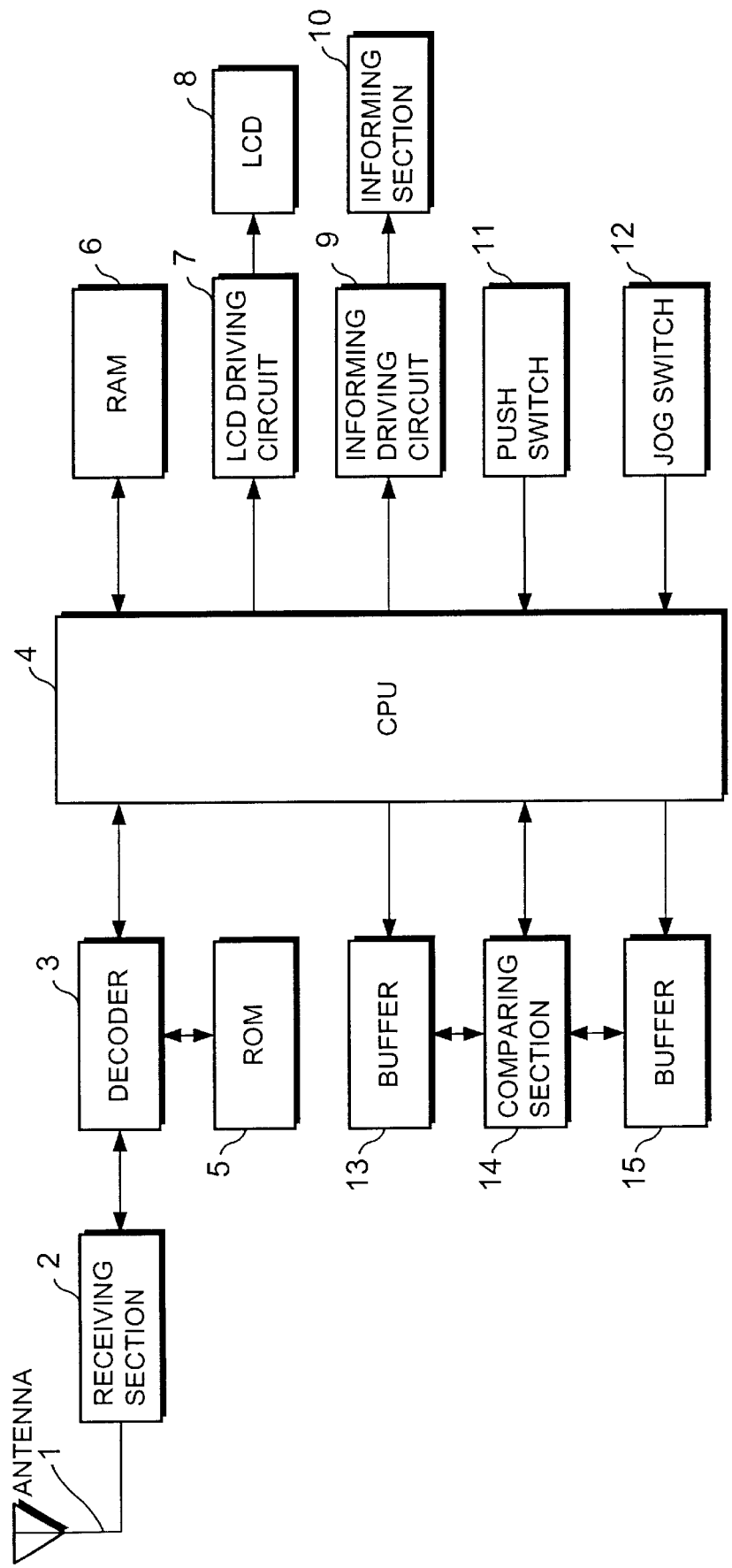

Fig. 7b
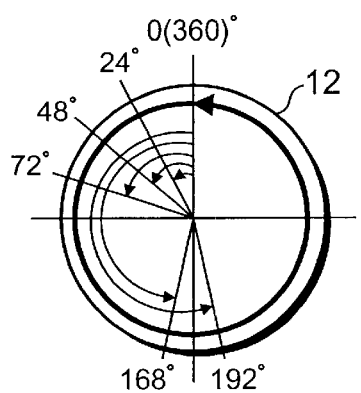
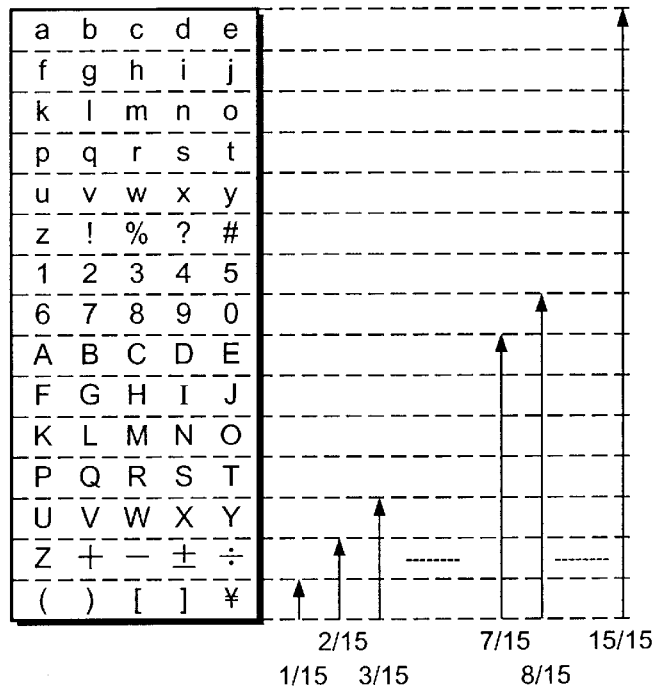

Fig. 8

| ADDRESS | FLAG | CONTENT OF MESSAGE | | | | |
|---|---|---|---|---|---|---|
| 1 | 0 | L | e | t | ' | s |
| 2 | 0 |   | p | l | a | y |
| 3 | 0 |   | b | a | s | e |
| 4 | 0 | b | a | l | l |   |
| 5 | 0 | t | o | m | o | r |
| 6 | 0 | r | o | w | ! |   |
| 7 | 0 | A | r | e |   | y |
| 8 | 0 | o | u |   | f | r |
| 9 | 0 | e | e | ? |   |   |
| 10 | 1 | G | o | o | d |   |
| 11 | 1 | N | i | g | h | t |
| 12 | 0 | C | a | l | l |   |
| 13 | 0 | m | e | ! |   |   |
| 14 | 1 | I |   | w | i | l |
| 15 | 1 |   |   | b | e |   |
| 16 | 1 |   | a | t | e | . |

Fig. 9b

| L | e | t | ' | s |
|---|---|---|---|---|
|   |   | p | l | a | y |
|   |   | b | a | s | e |
| b | a | l | l |   |
| t | o | m | o | r |

Fig. 9f

|   | b | a | s | e |
| b | a | l | l |   |
| t | o | m | o | r |
| r | o | w | ! |   |
| A | r | e |   | y |

Fig. 9c

| p | l | a | y |   |
| b | a | s | e |   |
| b | a | l | l |   |
| t | o | m | o | r |
| r | o | w | ! |   |

Fig. 9g

| p | l | a | y |   |
| b | a | s | e |   |
| b | a | l | l |   |
| t | o | m | o | r |
| r | o | w | ! |   |

Fig. 9d

|   | b | a | s | e |
| b | a | l | l |   |
| t | o | m | o | r |
| r | o | w | ! |   |
| A | r | e |   | y |

Fig. 9h

| L | e | t | ' | s |
|   | p | l | a | y |
|   | b | a | s | e |
| b | a | l | l |   |
| t | o | m | o | r |

RADIO COMMUNICATION DEVICE HAVING UNDERLINING SCROLL DISPLAY FUNCTION

BACKGROUND OF THE INVENTION

1. Field of the Invention

The present invention relates to a radio communication device, more particularly to a radio communication device which reads out information stored therein to display it.

2. Description of the Related Art

Recently, radio communication devices, for example, portable telephones, have been manufactured to be smaller in size and lighter in weight. With miniaturization of the portable telephone unit, a size of a display portion reduces, so that a quantity of information that can be displayed on the display portion at a time becomes small.

For this reason, a message containing a large quantity of information cannot be displayed on the display portion at a time. Under such situation, when a user presses down the scroll button, the message is read out sequentially from its leading content and displayed on the display portion.

At this time, the message displayed on the display portion is displayed, for example, in the order where it is received. Accordingly, when it is intended to display the message that was received first, all of the messages that have been received until now must be displayed in the receiving order. This takes a very long time. Furthermore, when the message is read out, a specified button for reading out the message must be pressed down, so that the operability of the portable telephone is degraded.

Accordingly, technologies that can enhance the operability of the portable telephone and read out desired message in a short time have been proposed.

In the individual selection calling receiver disclosed in Japanese Patent Laid-Open No. Heisei 8-186852, when the scroll button is pressed down under the situation where PAGE1-1 is displayed, PAGE1-2 and PAGE1-3 that are the messages following the PAGE-1 are sequentially displayed every time the scroll button is pressed down as shown in FIG. 1. Subsequently, the messages after the message PAGE2-1 are displayed sequentially. Specifically, all of the messages are displayed sequentially to the end. On the other hand, when another button other than the scroll button is pressed down under a situation where the PAGE1-1 is displayed, a leading page PAGE2-1 that is for the next message is displayed, and a leading page PAGE3-1 that is for the further next message is displayed subsequently. Specifically, only the leading page of each message is sequentially displayed. Accordingly, when it is intended to display a message PAGE4-1, only leading page of each message is sequentially displayed by pressing down a button different from the scroll button, whereby a desired message can be retrieved in a shorter time than that required for sequentially displaying all of the messages.

In a communication terminal apparatus disclosed in Japanese Patent Laid-Open No. Hei 8-79361, when an operation to allow a cursor to move upward is performed on a transfer function setting screen "Forward" under a situation where the cursor is in a high order item "Intro" as shown in FIG. 2, the cursor moves to the highest order item "Control" of a personal ID number function setting screen "PIN1" of the previous page. Similarly, when an operation to move the cursor upward is performed under a situation where the cursor is in the high order item "Control" in the personal ID number setting screen "PIN1", the cursor moves to the highest order item "Sel Mode" of a public landit mobile network function setting screen "PLMNselect" of the previous page. Accordingly, since the screen can be scrolled at a high speed, a desired item can be retrieved in a short time.

In a communication terminal apparatus disclosed in Japanese Patent Laid-Open No. Hei 9-261758, as shown in FIG. 3, when the message is received from other person while a telephone call is in progress and information about the party on the other end is displayed on the display portion, information about the other call is displayed on the display portion. Specifically, processing items, "Activate" "Disconnect" and "Multi Party" which are performed for the message receipt are displayed together with the information about the other call. At this time, the processing item "Activate" is displayed in its reversed form, and when the user presses down the scroll button, the processing items "Disconnect" and "Multi Party" are sequentially displayed in its reversed form. The user presses down the scroll button to select a desired item and presses down a click button to execute the selected processing. Accordingly, it is not necessary for the user to remember all of operation methods concerning the received message processing, so that the user can perform the received message processing easily and reliably.

In a communication terminal apparatus disclosed in Japanese Patent Laid-Open No. Hei 10-93678, as shown in FIG. 4, when a jog dial is clicked in a screen for waiting the message to be received, a list of other persons for conversation is displayed. At this time, the other person "Robert" in the uppermost line is displayed in its reversed form. When the user rotates the jog dial downward, the subsequent other persons "George" and "Sally" are sequentially displayed in its reversed form. When the user clicks the jog dial under a situation where a desired other person "Jack" for conversation is displayed in its reversed form, information about the other person "Jack" is displayed. Thereafter, by pressing down the jog dial for a predetermined time, a call for the other person "Jack" for conversation is performed. Thus, since a selection of the other person for conversation, a display of information about the other person for conversation and a call for the other person for conversation can be performed only by manipulating the jog dial, an operability in calling the other person for conversation can be enhanced.

In a communication terminal apparatus disclosed in Japanese Patent Laid-Open No. Heisei 10-155020, as shown in FIG. 5, when the user clicks the jog dial to select the desired other person "Ellis" for conversation under a situation where a telephone directory screen is displayed, information concerning the other person "Ellis" is displayed. Under such situation, when the jog dial is rotated upward, the displaying returns to the telephone directory screen automatically, and the cursor moves to "John" located immediately above "Ellis". Accordingly, under a situation where the information concerning "Ellis" is being displayed, it is unnecessary to again display the telephone directory screen by pressing down predetermined another button, and to move the cursor to the next other person "John" by rotating the jog dial. Thus, the display screen can be switched with less manipulations and a desired other person for conversation can be retrieved in a short time.

However, in the above described individual selection calling receiver disclosed in Japanese Patent Laid-Open No. Heisei 8-186852, when the message composed of PAGE1-1, 1-2 and 1-3 is displayed on the display portion, PAGE1-2 and PAGE1-3 are sequentially displayed by pressing down the scroll button under a situation where PAGE1-1 is being displayed. Specifically, by pressing down the scroll button, the displaying of the message is switched for each page. Accordingly, it is, difficult for the user to know a correlation between the message obtained by scrolling and the message before scrolling. For example, it is difficult for the user to judge whether the message displayed after scrolling shows a continuation of the message displayed in the last time or a message prior to the message displayed in the last time.

Furthermore, other prior arts described above do not clearly show a relation of the message that is being displayed with the message displayed in the last time, when a message which is longer than one that can be displayed on the display portion at a time is displayed, and do not have such technical concept.

SUMMARY OF THE INVENTION

The object of the present invention is to provide a radio communication apparatus which is obtained by further improving a conventional radio communication apparatus.

Another object of the present invention is to provide a radio communication apparatus which clarifies the relation in the display order between a message that is being displayed and a message displayed in the last time.

In order to achieve the foregoing objects, the radio communication apparatus of the present invention comprises a receiving section for receiving a message; a storing section for storing the message; a reading-out section for reading out the message stored in the storing section; a displaying section for displaying the message read out; a scrolling section for scrolling the message displayed on the displaying section; and a controlling section for distinctively displaying a message before and after scrolling when the scrolled portion of the message is displayed. It is preferable that the controlling section underlines the portion of the message, which was displayed before scrolling, out of the message after scrolling. Furthermore, the controlling section may display the portion of the message, which was displayed before scrolling, out of the message after scrolling, in reverse video. The controlling section may display the part of the message before scrolling, out of the message after scrolling, by flashing it. The controlling section may underline the portion other than the message before scrolling, out of the message after scrolling. The controlling section may display the portion other than the message before scrolling, out of the message after scrolling, in reverse video. The controlling section may display the portion other than the message before scrolling, out of the message after scrolling, by flashing it. The scrolling section should preferably be a jog switch. The radio communication apparatus should preferably further comprise a first memory section for memorizing the message before scrolling; a second memory section for memorizing the message after scrolling; and a comparing section for comparing the portion of the message before scrolling memorized in the first memory section with the portion of the message after scrolling memorized in the second memory section. The storing section should preferably store the message after splitting the message into the predetermined number of characters, which has been received by the receiving section. The number of characters should preferably be within the number of character rows which can be displayed on the displaying section.

A scrolling display control method of the radio communication apparatus of the present invention comprises a step for receiving a message; a step for storing the message; a step for reading out the message stored; a step for displaying the message read out; a step for scrolling the message displayed; and a step for controlling the scrolled message so that the portion of the message before scrolling and the portion of the message after scrolling are distinctively displayed. In the controlling step, the potion of the message before scrolling out of the message after scrolling should preferably be underlined. Furthermore, in the controlling step, the portion of the message before scrolling out of the message after scrolling may be displayed in reverse video. In the controlling step, the portion of the message before scrolling out of the message after scrolling may be displayed by flashing it. Moreover, in the controlling step, the portion other than the message before scrolling out of the message after scrolling may be underlined. In the controlling section, the portion other than the message before scrolling out of the message after scrolling may be displayed in reverse video. In the controlling step, the portion other than the message before scrolling out of the message after scrolling may be displayed by flashing it. The scrolling display control method should preferably comprise a step for memorizing the message before scrolling; a step for memorizing the message after scrolling; and a step for comparing the message before scrolling memorized in the first memory step with the message after scrolling memorized in the second memory section.

Accordingly, in the present invention, when the message is scrolled under a situation where the message is being displayed on an LCD, the portion which has been displayed on the previous screen, out of the message which are newly displayed, is underlined, so that a relation in the display order between the portions of the message is made clear and the user can easily read out the message.

BRIEF DESCRIPTION OF THE DRAWINGS

These and other objects, features and advantages of the invention will become more fully apparent from the following detailed description taken in conjunction with accompanying drawings.

FIG. 6 is a figure showing a preferable example of a circuit diagram of a radio selection calling receiver of the present invention.

FIGS. 7a and 7b are figures showing a relation between a rotation quantity of a jog switch 12 shown in FIG. 6 and a scrolling quantity of a message in an LCD 8.

FIG. 8 is a figure showing an internal table of a RAM 6 shown in FIG. 6.

FIGS. 9a to 9h are figures for explaining a display example of the LCD 8 based on a rotation of the jog switch 12.

FIGS. 12a to 12h are figures for explaining a display example of the LCD 8 based on a rotation of the jog switch 12.

DETAILED DESCRIPTION OF THE PREFERRED EMBODIMENTS

Figure 1:
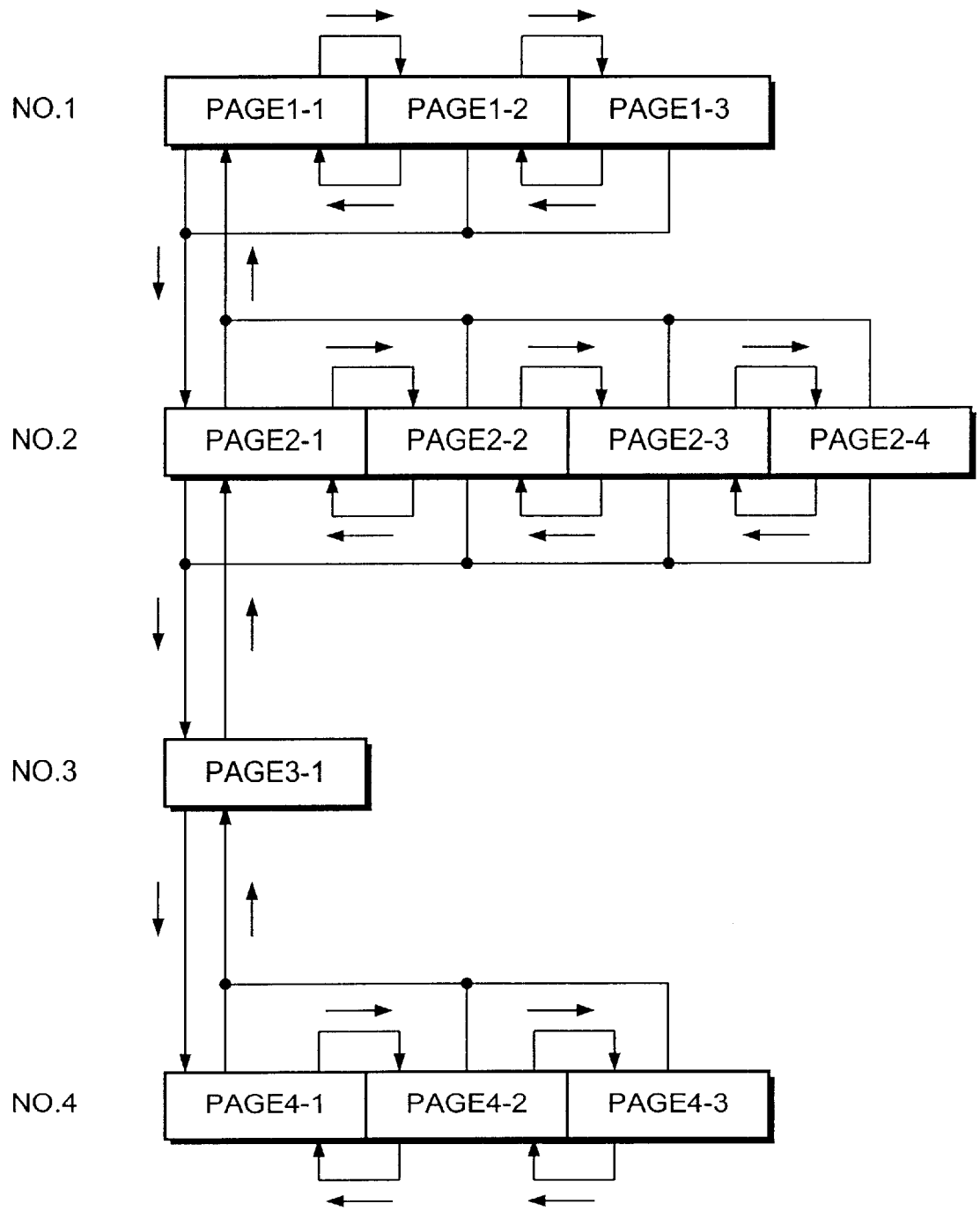
FIG. 1 is a figure for explaining an example of a display control method of a conventional radio communication apparatus.
Figure 2:
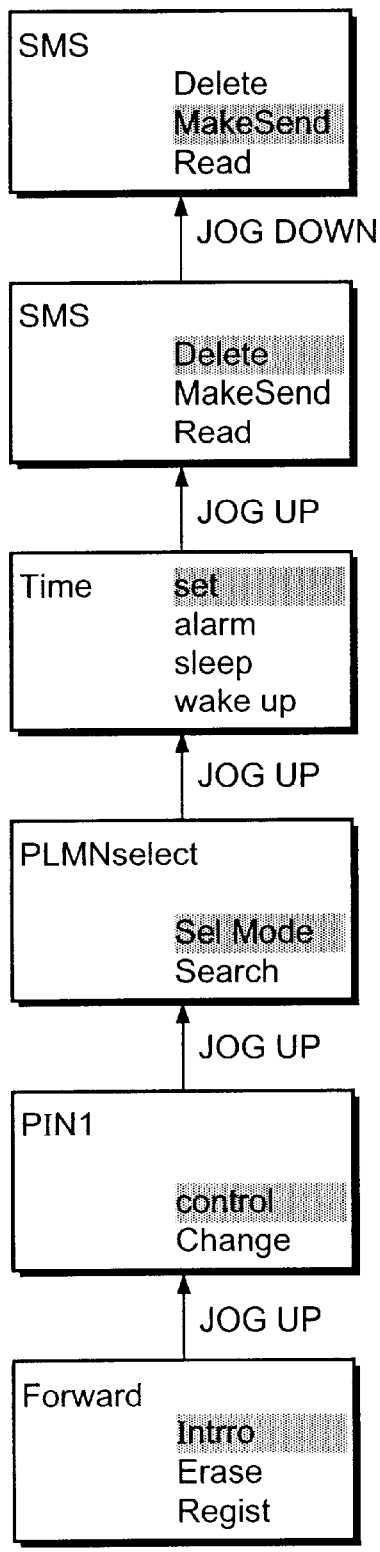
FIG. 2 is a figure for explaining an example of a display control method of a conventional radio communication apparatus.
Figure 3:
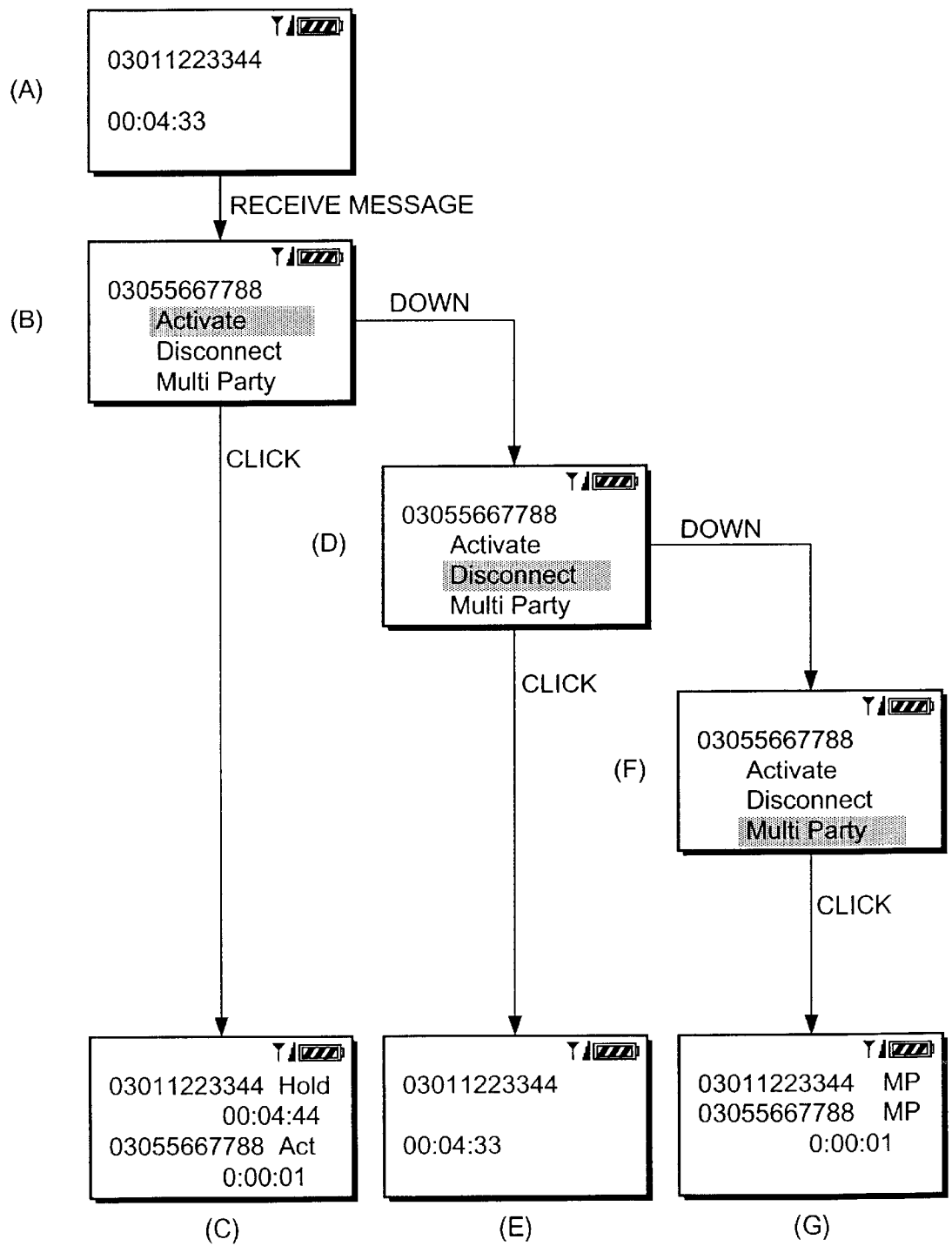
FIG. 3 is a figure for explaining an example of a display control method of a conventional radio communication apparatus.
Figure 4:
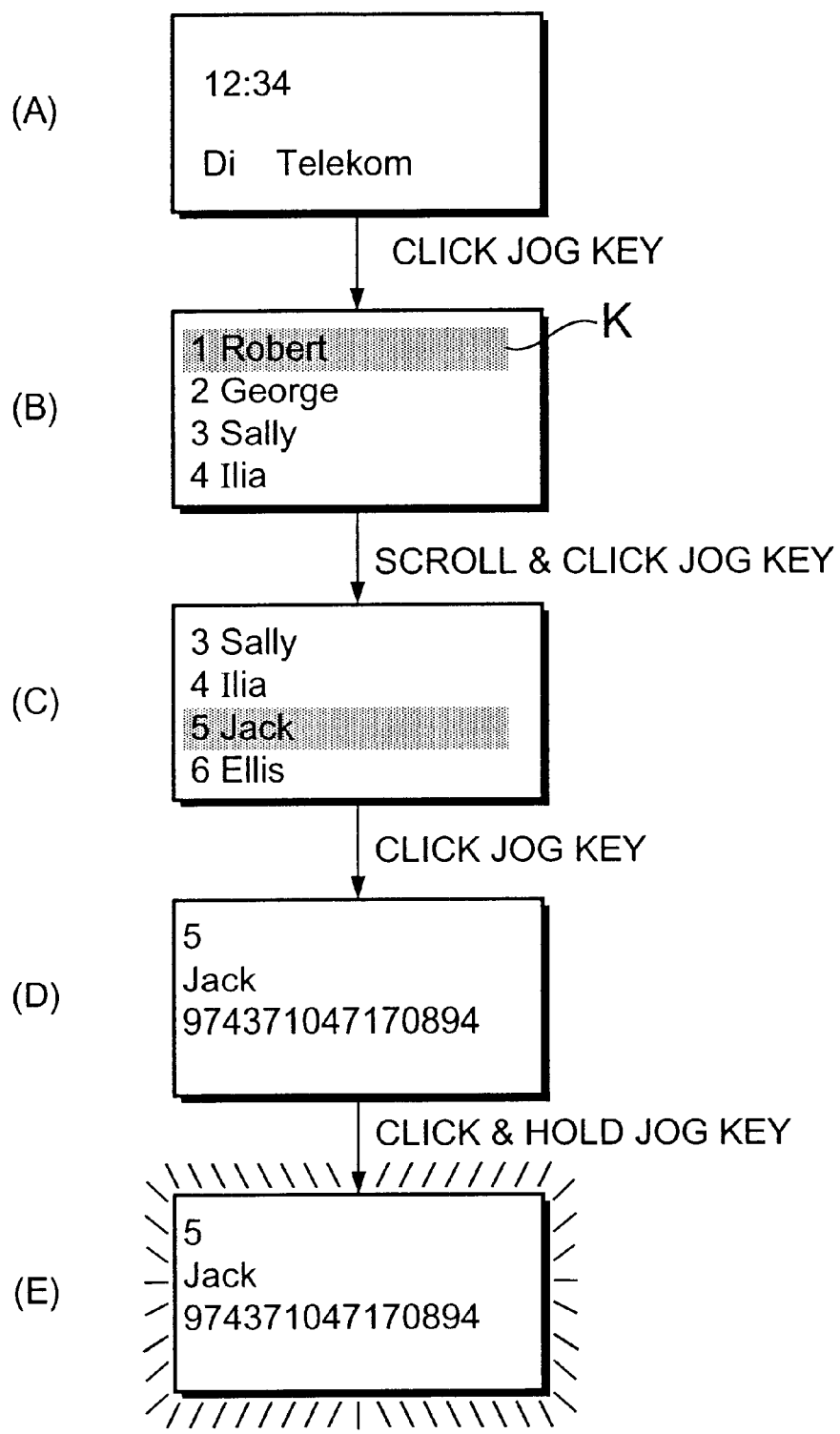
FIG. 4 is a figure for explaining an example of a display control method of a conventional radio communication apparatus.
Figure 5:
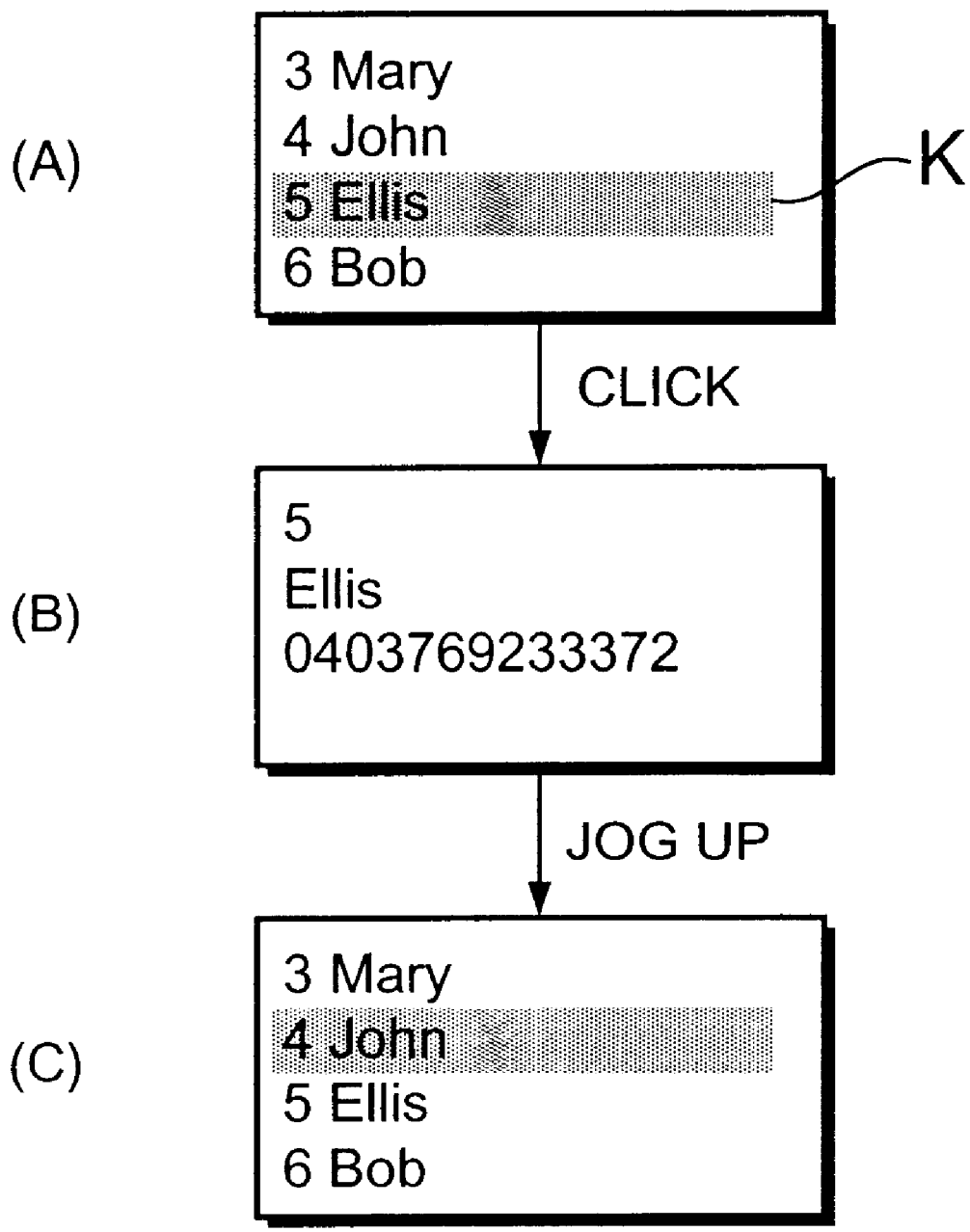
FIG. 5 is a figure for explaining an example of a display control method of a conventional radio communication apparatus.

FIG. 6 is a figure showing a preferable example of a circuit diagram of a radio communication device, for example, a radio selection calling receiver of the present invention.

In FIG. 6, a receiving section 2 amplifies and decodes a radio signal from a base station (not shown) with an antenna 1, so as to convert the radio signal to a digital signal which has been subjected to a wave-shaping. A decoder 3 checks a selection calling number in the received signal against a selection calling number allocated to the radio receiver itself. A ROM 5 memorizes the selection calling number allocated to the radio receiver itself. A RAM 6 stores message data contained in the received signal. An LCD driving circuit 7 controls an LCD 8 for displaying a received message, and an informing driving circuit 9 controls an informing section 10 for informing the user of a receipt of the signal. The informing section 10 should preferably be at least one of a speaker, an LED and a vibrator. A push switch 11 is a switch which serves so that information stored in the RAM 6, for example, a received message is read out and the received message is allowed to be displayed on the LCD 8. Moreover, the push switch 11 is pressed down when information of the receipt of the signal to the user by the information section 10 is stopped. A jog switch 12 is a switch to scroll the received message displayed on the LCD 8 upward and downward when the received message is too long to display on one screen. The jog switch 12 is a disk-shaped switch which can be handled by one hand so as to perform various kinds of operations, which has been widely used for portable telephones and radio selection calling receivers. The jog switch 12 is freely rotated clockwise and counterclockwise. When the user rotates the jog switch 12 clockwise, the message displayed on the display section 5 is scrolled upward. On the other hand, when the user rotates the jog switch 12 counterclockwise, the message is scrolled downward. The scroll quantity of the message is determined depending on the rotation quantity of the jog switch 12. Specifically, as the jog switch 12 is rotated, the message is scrolled.

Instead of the jog switch 12, a scroll button may be provided. In the case where the scroll button is used, the message is scrolled by pressing down the scroll button. At this time, the scroll quantity of the message is determined depending on the period of time during which the scroll button is being pressed down. In short, any device may be good enough as long as the information displayed on the LCD 8 is scrolled.

Buffers 13 and 15 temporarily store the message before and after scrolling, respectively. A comparing section 14 compares the message stored in the buffer 13 and the message stored in the buffer 15, and outputs the comparison result to a central processing unit (hereinafter, referred to as a CPU) 4. Based on the comparison result from the comparing section 14, the CPU 4 underlines the same portion as the message before scrolling when the CPU 4 allows the LCD 8 to display the message after scrolling.

Next, a preferable operation example of the radio selection calling receiver shown in FIG. 6 will be described briefly.

A radio signal from a base station (not shown), for example, a radio signal based on a POCSAG system, is received by a receiving section 2 via an antenna 1. The radio signal received by the receiving section 2 is amplified and decoded, and outputted to a decoder 3 as a digital signal which has been subjected to a wave-shaping. A selection calling number contained in the digital signal which is inputted to the decoder 3 is compared with a selection calling number of the receiver itself, which is memorized in a ROM 5. If these selection calling numbers are coincident with each other, message data subsequent to the received selection calling number is supplied to the CPU 4 from the decoder 3. The CPU 4 allows a RAM 6 to store the inputted message data, and sends a control signal to an informing driving circuit 9 based on informing means which had been previously decided by the person who received the radio signal, thus allowing an informing section 10 to operate. Informing the receipt of the signal by the informing section 10 is stopped by pressing down the push switch 11. Thereafter, when the push switch 11 is pressed down, the message data stored in the RAM 6 is read out, and displayed on the LCD 8 via the LCD driving circuit 7. When the jog switch 12 is rotated under a situation where the message data is being displayed on the LCD 8, the message data displayed is scrolled either upward or downward based on the rotation quantity of the jog switch 12. When the message data displayed is scrolled, out of the message displayed this time, the same portion as the message which was displayed before scrolling is underlined.

Figure 7A:
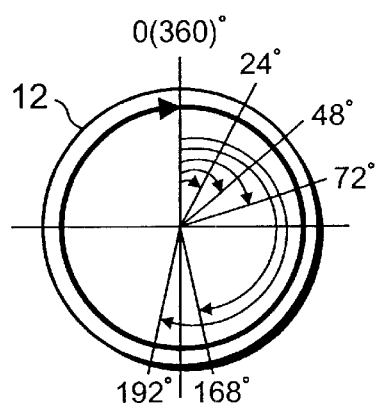

FIG. 7a is a figure illustrating the relation between the rotation quantity of the jog switch 12 when the switch 12 is rotated clockwise and the scrolling quantity of the message displayed on the LCD 8. FIG. 7b is a figure illustrating the relation between the rotation quantity of the jog switch 12 when the switch 12 is rotated counterclockwise and the scrolling quantity of the message displayed on the LCD 8.

Referring: to FIG. 7a, when the jog switch 12 is rotated clockwise by 1/15 of 360-degree arc, that is, when the jog switch 12 is rotated clockwise in a 24-degree arc, the message displayed on the LCD 8 is scrolled upward by one line. Similarly, when the jog switch 12 is rotated clockwise in a 48-degree arc, the message is scrolled upward by two lines. When the jog switch 12 is rotated clockwise in a 72-degree arc, the message is scrolled upward by three lines. Moreover, the jog switch 12 is rotated clockwise in a 168-degree arc, the message is scrolled upward by seven lines, and when the jog switch 12 is rotated clockwise in a 192-degree arc, the message is scrolled upward by eight lines. Then, when the jog switch 12 is rotated clockwise in a 360-degree arc, that is, when the jog switch 12 is turned over once, the message is scrolled upward by fifteen lines.

Referring to FIG. 7b, when the jog switch 12 is rotated counterclockwise by 1/15 of 360-degree arc, that is, when the jog switch 12 is rotated counterclockwise in a 24-degree arc, the message displayed on the LCD 8 is scrolled downward by one line. Similarly, when the jog switch 12 is rotated counterclockwise in a 48-degree arc, the message is scrolled downward by two lines. When the jog switch 12 is rotated counterclockwise in a 72-degree arc, the message is scrolled downward by three lines. Moreover, the jog switch 12 is rotated counterclockwise in a 168-degree arc, the message is scrolled downward by seven lines, and when the jog switch 12 is rotated counterclockwise in a 192-degree arc, the message is scrolled downward by eight lines. Then, when the jog switch 12 is rotated counterclockwise in a 360-degree arc, that is, when the jog switch 12 is turned over once, the message is scrolled downward by fifteen lines.

FIG. 8 is a figure showing an internal table of the RAM 6 illustrated in FIG. 6.

Referring to FIG. 8, the identical flag is continuously given to the continuous message. Moreover, the flags "0" and "1" are alternately given to the messages every time the message terminates. Accordingly, addresses "1" to "9" construct one message. The flag changes from "0" to "1" at the address "10" and the flag is "1" also at the address "11", so that one message is constructed by the addresses "10" and "11". Similarly, one message is constructed by the addresses "12" and "13", and one message is constructed by the addresses "14" to "16". The message is stored by the number of character rows to be displayed on the LCD 8. Hereinafter, in this specification of the application of the present invention, the case where the number of character rows to be displayed on the LCD 8 is five will be described. However, the number of character rows to be displayed on the LCD 8 is not limited to five.

FIGS. 9a to 9h are figures for explaining a display example by the LCD 8 based on the rotation of the jog switch 12. FIGS. 9b to 9d and FIGS. 9f to 9h show display examples by the LCD 8 which is capable of displaying 25 characters on one screen, specifically, five lines x five characters on one screen.

Figure 9A:
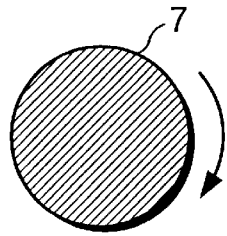

When the jog switch 12 is rotated clockwise by ⅟₁₅ of 360 degree arc as shown in FIG. 9a under a situation where the information shown in FIG. 9b is being displayed on the LCD 8, that is, when the jog switch 12 is rotated in 24-degree arc, the information "Let's" at the uppermost line is scrolled upward among the information shown in FIG. 9b, and new information "row!_" is displayed at the lowermost line. At this time, the information that has been displayed in FIG. 9l, that is, the information before scrolling, "_play", "_base" "_ball" and "tomor", are underlined. Thereafter, when the jog switch 12 is rotated clockwise in 24-degree arc as shown in FIG. 9a under a situation where the information shown in FIG. 9c is being displayed on the LCD 8, the information "_play" at the uppermost line among the information shown in FIG. 9c is scrolled upward, and new information "Are_y" is displayed at the lowermost line shown in FIG. 9d. At this time, the information which has been displayed in FIG. 9c, that is, the information before scrolling, "_base", "ball_", "tomor" and "row!_", are underlined.

Figure 9E:
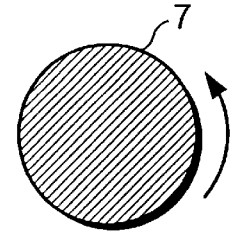

On the other hand, when the jog switch 12 is rotated counterclockwise by ⅟₁₅ of 360-degree arc as shown in FIG. 9e under a situation where the information shown in FIG. 9f is being displayed on the LCD 8, that is, when the jog switch 12 is rotated counterclockwise in 24-degree arc, the information "Are_y" at the lowermost line among the information shown in FIG. 9f is scrolled downward, and new information "_play" is displayed at the uppermost line as shown in FIG. 9g. At this time, the information which has been displayed in FIG. 9f, that is, the information before scrolling, "_base", "_ball", "tomor" and "row!_", are underlined. Thereafter, when the jog switch 12 is rotated counterclockwise in 24-degree arc as shown in FIG. 9e under a situation where the information shown in FIG. 9g is being displayed on the LCD 8, the information "row!_" at the lowermost line of the information shown in FIG. 9g is scrolled downward, and new information "Let's" is displayed at the uppermost line as shown in FIG. 9h. At this time, the information which has been displayed in FIG. 9g, that is, the information before scrolling, "_play", "_base", "ball_" and "tomor", are underlined.

In the case of the LCD 8 which is capable of displaying two lines of characters, when the message is scrolled upward or downward one line by one line, the message on the first line, which is displayed on the screen after scrolling, of the message on the two lines is always the message which has been displayed on the previous screen. For this reason, under a situation where the message is scrolled upward or downward one ling by one line, the message on the first line is always underlined.

On the other hand, in the case where the LCD 8 is capable of displaying the character lines of three lines or more, when the message is scrolled downward one line by one line, the message other than the message at the lowermost line of the three lines or more displayed on the screen after scrolling is always the one that was displayed on the previous screen. For this reason, under a situation where the message is scrolled downward one line by one line, the message at the lowermost line is not underlined, and the message other than the message at the lowermost line is always underlined.

A preferable example of a display controlling operation in the LCD 8 of the radio selection calling receiver shown in FIG. 6 will be described using a flowchart of FIG. 10.

Figure 10:
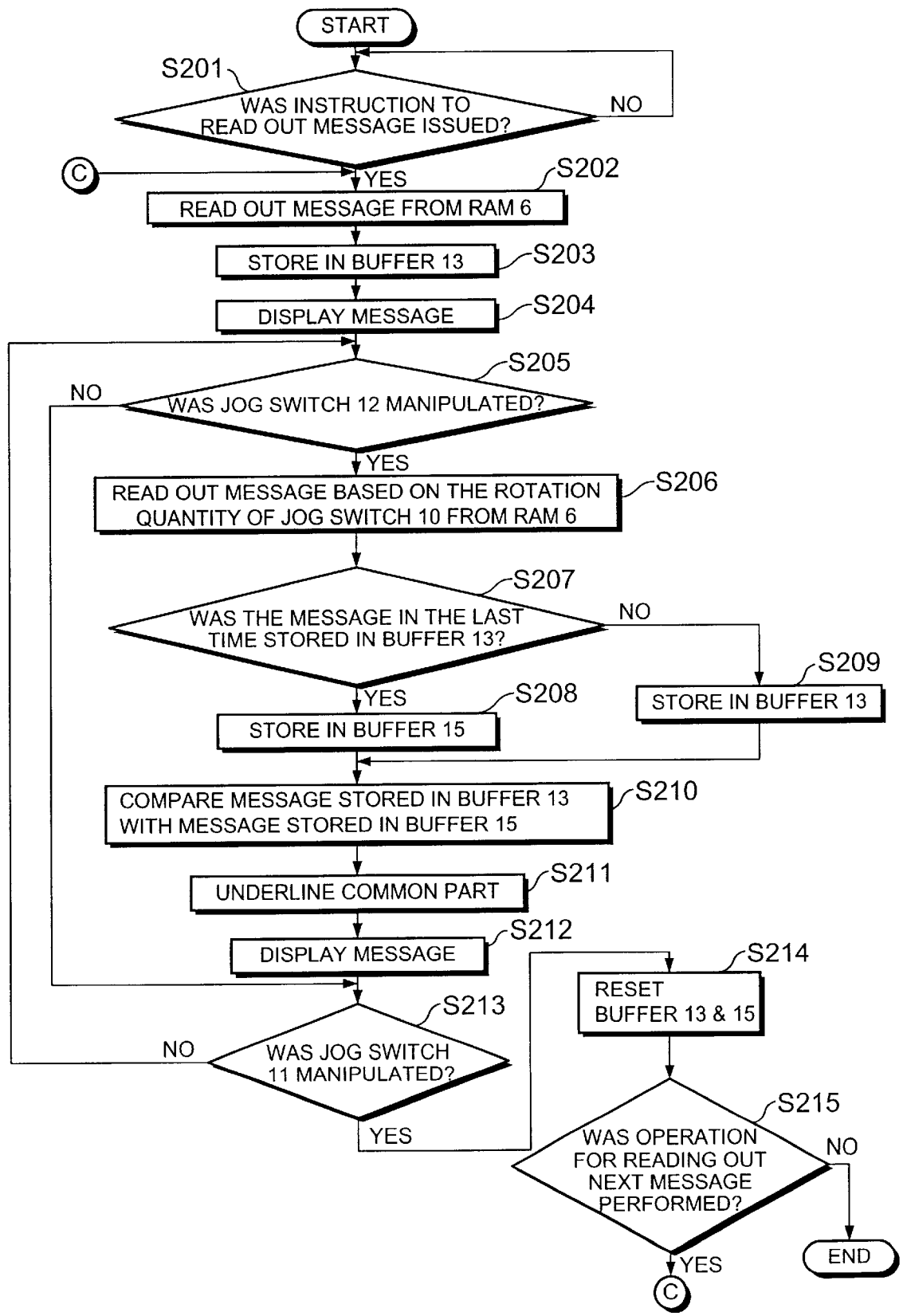
FIG. 10 is a flowchart for explaining a preferable display controlling operation in the LCD 8 of the radio selection calling receiver shown in FIG. 6.

Referring to the flowchart of FIG. 10, it is decided whether or not an instruction of reading out the message is issued by the CPU 4, that is, it is decided whether or not the message is received. Alternatively, it is decided whether or not an operation of reading out the message is performed by the user (S201). If the instruction of reading out the message is issued (YES in S201), the message is read out from the RAM 6 (S202). The message read out from the RAM 6 is temporarily stored in the buffer 13 (S203). At this time, when the message read out from the RAM 6 is composed of equal to or more than twenty five characters, the twenty five characters, for example, being the number of characters which can be displayed on the LCD 8, the leading twenty five characters of the message of the whole message read out are stored in the buffer 13. After the message is stored in the buffer 13, the message composed of twenty five characters, which have been stored in the buffer 13, is displayed on the LCD 8 (S204). Thereafter, it is decided whether or not a manipulation of the jog switch 10 is performed by the user (S205).

If the manipulation of the jog switch is performed by the user under a situation where the message is being displayed on the LCD 8 (YES in S205), the message which was scrolled based on the rotation direction and rotation quantity of the jog switch 10 is read out from the RAM 6 (S206). At this time, if the message which was displayed on the LCD 8 is not followed by subsequent message, the message displayed on the LCD 8 does not show any change even though the user manipulates the jog switch 10. The decision as to whether or not the message is followed by subsequent message is performed depending on whether or not the same flag as that of the message that is currently being displayed on the LCD 8 exists subsequently.

In a processing of the step S206, when the message scrolled based on the rotation direction and rotation quantity of the jog switch 10 is read out from the RAM 6, it is decided whether or not the message was stored in the buffer 13 in the last time (S207). The decision as to whether or not the message was stored in the buffer 13 in the last time is conducted in the following manner. Specifically, the final address among addresses corresponding to the message shown in FIG. 8 was stored in the buffer 13 when the message was stored in the buffer 13 in the last time, and then it is decided whether the address corresponding to the message read out from the RAM 6 in this time is the one subsequent to the address stored in the buffer 13. If the message was stored in the buffer 13 in the last time (YES in S207), the message read out from the RAM 6 is stored in the buffer 15 (S208). On the other hand, if no message was stored in the buffer 13 in the last time, specifically, if the message was stored in the buffer 15 (NO in S207), the message read out from the RAM 6 is stored in the buffer 13 (S209). If the message has been already stored in both of the buffers 13 and 15, the message to be stored is superscribed. Thereafter, the message stored in the buffer 13 and the message stored in the buffer 15 are compared with each other by the comparing section 14 (S210). The comparing section 14 compares the messages and issues an instruction to the CPU 4 so that the CPU 4 underlines the common portions of the messages (S211). The CPU 4 receives the instruction issued from the comparing section 14 and underlines the common portions of the messages, and allows the LCD 8 to display the messages stored in the buffers 13 and 15 thereon (S212).

In the processing of the step S205, if it is decided that the jog switch 12 was not manipulated by the user, it is decided whether the push switch 11 was manipulated by the user, in the processing of the step S212, under a situation where the message is being displayed. If it is decided that the push switch 11 was not manipulated by the user (NO in S213), the processings subsequent to the step S205 are performed again. On the other hand, if it is decided that the push switch 11 was manipulated by the user (YES in S213), the buffers 13 and 15 are initialized, that is, they are reset (S214). Thereafter, it is decided whether or not a predetermined operation for reading out a subsequent message was performed (S215). If the predetermined operation for reading out the subsequent message was performed (YES in S215), the processings subsequent to the step S202 are performed again.

A preferable example of an operation of the radio selection calling receiver shown in FIG. 6 at the time when a signal is received will be described using FIG. 11 in detail.

Figure 11:
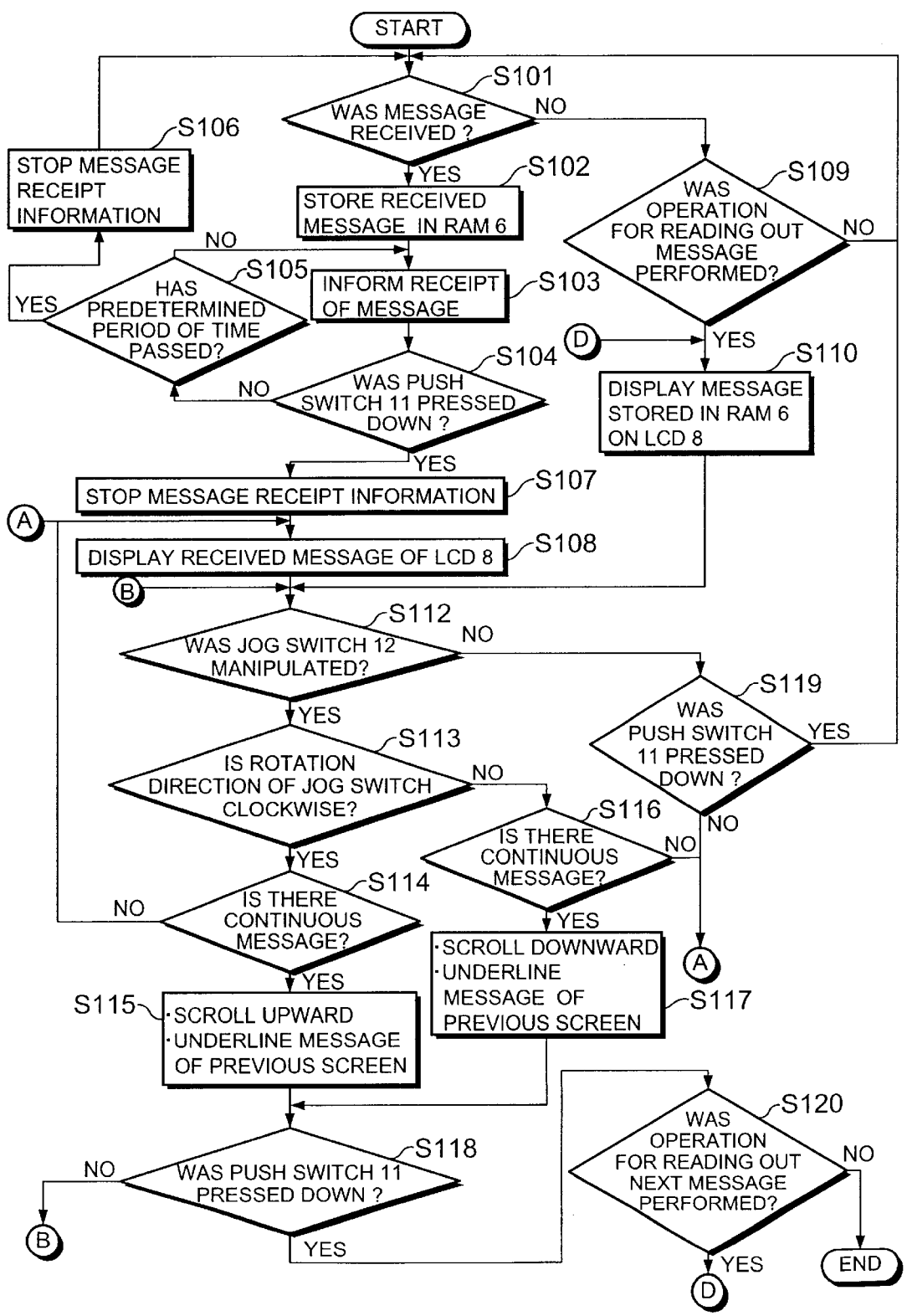
FIG. 11 is a flowchart for detailed explanation of a preferable display controlling operation of the radio selection calling receiver shown in FIG. 6.
Figure 12A:
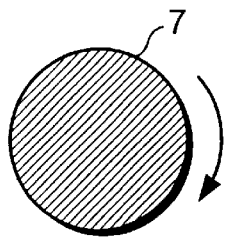
Figure 12E:
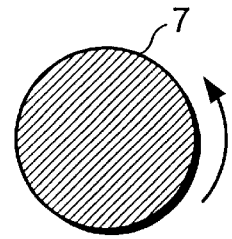

Referring to FIG. 11, it is first decided whether the message is received (S101). If it is decided that the message was received (YES in S101), the received message is stored in the RAM 6 (S102), and the informing section 10 informs the receipt of the message via the informing driving circuit 9 (S103). The newly received message is first stored in the address "1" of the RAM 6 and the next message is then stored in the address "2" thereof and so on. The received message that has been already stored therein is moved downward by the number of the addresses occupied by the newly received message. Moreover, the amount of the messages capable of being stored in the RAM 6 shall be in a range satisfying the predetermined number of addresses, for example, 100 addresses. For the message receipt information by the informing section 10, it is decided whether the push switch 1 was pressed down by the user (S104). If the push switch 11 was not pressed down by the user, it is decided whether a predetermined period of time, for example, 10 seconds, has passed (S105). When a predetermined period of time has passed after the message receipt information (YES in S105), the message receipt information is stopped (S106), and the step moves to a state for waiting a receipt of a message. The processings of the steps S103 to S105 are sequentially performed from the message receipt information up to the passage of the predetermined; period of time. On the other hand, if it is decided in the step S104 that the push switch 11 is pressed down by the user, the message receipt information is stopped (S107), and the received message stored in the RAM 6 is displayed on the LCD 8 (S108).

On the other hand, if it is decided in the step S101 that no message was received, it is decided whether a predetermined operation for reading out the message stored in the RAM 6 was performed by the user (S109). If the predetermined operation for reading out the message stored in the RAM 6 was performed by the user (YES in S109), the number of characters which can be displayed on the LCD 8 are displayed thereon in order beginning from the characters stored in the address "1" (S110).

Under a situation where the received message is being displayed on the LCD 8 in the step S108 or under a situation where the message stored in the RAM 6 is being displayed on the LCD 8 in the step S110, it is decided whether the jog switch 12 was manipulated by the user (S112). If the jog switch 12 was not manipulated by the user (NO in S112), it is decided whether the push switch 11 was manipulated by the user (S119). If the push switch 11 was manipulated by the user (YES in S119), the step returns to a state for waiting a receipt of a message.

If it is decided in the step S112 that jog switch 12 was manipulated by the user, it is decided whether or not the rotation direction of the jog switch manipulated by the user is clockwise (S113). If it is decided that the rotation direction of the jog switch 12 is clockwise (YES in S113), it is decided whether or not a message subsequent to the message displayed on the LCD 8 exists (S114). If the message subsequent to the message displayed on the LCD 8 exists (YES in S114), the message displayed on the LCD 8 is scrolled upward depending on the rotation quantity of the jog switch 12. At this time, of the message scrolled, the different portions of the message from that of the message before manipulating the jog switch 12 are underlined. (S115).

On the other hand, if it is decided in the step S113 that the rotation direction of the jog switch 12 manipulated by the user is not clockwise, that is, counterclockwise, it is decided whether a message subsequent to the message displayed on the LCD 8 exists (S116). If the message subsequent to the message displayed on the LCD 8 exists (YES in S116), the message that is being displayed on the LCD 8 depending on the rotation quantity of the jog switch 12 are scrolled downward. At this time, of the message scrolled, the different portions of the message from that: of the message before manipulating the jog switch 12 are underlined. (S117).

At the time the message displayed on the LCD 8 is scrolled, if it is decided in the steps S114 and S116 that no message subsequent to the message displayed on the LCD 8 exists, the message that has been displayed on the LCD 8 until now is not changed and still displayed on the LCD 8.

Furthermore, under a situation where the message scrolled depending on the rotation direction and rotation quantity of the jog switch 12 is being displayed on the LCD 8 in the steps S115 and S117, it is decided whether the push switch 11 was pressed down by the user (S118). If the push switch 11 was not pressed down by the user (NO in S118), the processings subsequent to the step S112 are performed again. On the other hand, if the push switch 11 was pressed down by the user (YES in S118), it is decided whether a predetermined operation for reading out the subsequent message stored in the RAM 6 was performed by the user (S120). If the predetermined operation for reading out the subsequent message was performed by the user, the processings subsequent to the step S110 are performed again.

In the radio communication apparatus of this embodiment, of the message displayed on the LCD 8, the portion that has been displayed on the previous screen is, underlined, as shown in FIGS. 9a to 9h. However, of the message displayed on the LCD 8, the portion other than the message that has been displayed on the previous screen, that is, the newly displayed portion, may be underlined as shown in FIGS. 12a to 12h. The display example of the LCD 8 based on the rotation of the jog switch 12 shown in FIGS. 12a to 12h is identical to that explained in FIGS. 9a to 9h except that the portions to be underlined are different, and to prevent a redundancy explanation, descriptions for them are omitted.

In the radio communication apparatus of this embodiment, as shown in FIGS. 9a to 9h and FIGS. 12a to 12h, the descriptions were made to the case where the message displayed on the LCD 8 which has an ability to display the message by five lines is scrolled by one line by one line. However, the number of lines of the message scrolled at a time is not limited to one at all. For example, in the case where the message is scrolled by two line at a time, if the jog switch 12 is rotated in 48-degree arc under a situation where the information shown in FIG. 9b is being displayed on the LCD 8, the information "Let's play" on the first and second lines of the information shown in FIG. 9b is scrolled upward, and the new information "row! Are y" is added as shown in FIG. 9d. Accordingly, the information that has been displayed in FIG. 9b, that is, the information before scrolling, "_base", "ball_" and "tomor", is underlined. Also in the case where the message is scrolled by three lines or more at a time, the relevant message is similarly underlined. Particularly, when the message is scrolled by five lines or more, the portion of the message after scrolling is the one newly added, so that all of the lines of the portion after scrolling is underlined.

Furthermore, in the radio communication apparatus of this embodiment, of the message displayed on the LCD 8, the portion of the message that has been displayed on the previous screen is underlined as shown in FIGS. 9a to 9h. However, the style of notation for the portion of the message that has been displayed on the previous screen, out of the message displayed on the LCD 8, is not limited to the underline. For example, the portion of the message that has been displayed on the previous screen, out of the message displayed on the LCD 8, may be displayed in reverse video, or alternatively displayed by flashing it. Furthermore, of the message displayed on the LCD 8, the portion that has been displayed on the previous screen may be displayed in a font different from that of the portion that has not been displayed on the previous screen, or alternatively the characters may be displayed in different font sizes. Further, alternatively, of the message displayed on the LCD 8, the portion that has been displayed on the previous screen may be displayed in a different color from that of the portion that has not been displayed on the previous screen. In short, it is good enough as long as of the message displayed on the LCD 8, the portion of the message that has been displayed on the previous screen can be discriminated from the portion of the message that has not been displayed on the previous screen. These styles of notations can be similarly applicable to the case where of the message displayed on the LCD 8, the portion of the message other than that of the message that has been displayed on the previous screen, that is, the portion newly added, is underlined as shown in FIGS. 12a to 12h.

Furthermore, in the radio communication apparatus of this embodiment, when the jog switch 12 is rotated clockwise as shown in FIGS. 9a to 9h, the message displayed on the LCD 8 is scrolled upward, and when the jog switch 12 is rotated counterclockwise, the message displayed on the LCD 8 is scrolled downward. However, the message displayed on the LCD 8 may be scrolled in an opposite direction to the rotation direction of the jog switch 12. Specifically, when the jog switch 12 is rotated clockwise, the message displayed on the LCD 8 may be scrolled downward, and when the jog switch 12 is rotated counterclockwise, the message displayed on the LCD 8 may be scrolled upward.

Furthermore, although the radio communication apparatus of this embodiment was described using the radio selection calling receiver as an example, the radio communication apparatus of this embodiment can be applied to the portable telephone, the portable information terminal and the like. In short, the present invention can be applied to any radio communication apparatus as long as it has an ability to display the message scrolled.

As described above, according to the present invention, when the message is scrolled under a situation where the message is being displayed on the LCD, of the newly displayed message, the portion of the message that has been displayed on the previous screen is underlined. Accordingly, the relation between the portion of the message that has been displayed on the previous screen and the portion of the message that has not been displayed on the previous screen is clarified, thus facilitating reading-out of the message for the user.

Obviously, numerous additional modifications and variations of the present invention are possible in light of the above teachings. It is, therefore, to be understood that within the scope of the appended claims, the inventions may be practiced otherwise than as specifically described herein.

What is claimed is:

1. A radio communication apparatus, comprising:

a message receiver;

storage for storing a received message;

a display for displaying text of the received message read from said storage;

a rotating switch that scrolls the text of the read message on said display an amount corresponding to an angular displacement of said rotating switch;

a comparator that compares (a) a first displayed portion of the text of the read message before scrolling by said rotating switch to (b) a second displayed portion of the text of the read message after scrolling by said rotating switch; and a processor that is responsive to said comparator and underlines the text of the read message that is contained in both said first and second displayed portions.

2. The apparatus of claim 1, wherein said display displays m lines of text of the read message, wherein each x degrees of angular displacement of said rotating switch scrolls the text of the read message by one of said m lines, and wherein a number of said m lines that are underlined corresponds to m minus an integer that is a number of degrees that said rotating switch is rotated divided by x.

3. The apparatus of claim 2, wherein x is 24.

4. A radio communication apparatus, comprising:

a message receiver;

storage for storing a received message;

a display for displaying a text of the received message read from said storage;

a rotating switch that scrolls the text of the read message on said display an amount corresponding to an angular displacement of said rotating switch;

a comparator that compares (a) a first displayed portion of the text of the read message before scrolling by said rotating switch to (b) a second displayed portion of the text of the read message after scrolling by said rotating switch; and a processor that is responsive to said comparator and that underlines the text of the read message that is displayed in said second displayed portion and not in said first displayed portion.

5. The apparatus of claim 4, wherein said display displays m lines of text of the read message, wherein each x degrees of angular displacement of said rotating switch scrolls the text of the read message by one of said m lines, and wherein a number of said m lines that are underlined corresponds to an integer that is a number of degrees that said rotating switch is rotated divided by x.

6. The apparatus of claim 5, wherein x is 24.

7. A method of operating a radio communication apparatus, comprising the steps of:

receiving a message;

storing the received message;

reading the stored message;

displaying text of the read message on a display;

scrolling the text of the read message on the display by rotating a rotating switch where an amount of the scrolled text corresponding to an angular displacement of the rotating switch;

comparing (a) a first displayed portion of the text of the read message before scrolling by the rotating switch to (b) a second displayed portion of the text of the read message after scrolling by said rotating switch; and underlining the text of the read message that is contained in both the first and second displayed portions.

8. The method of claim 7, wherein the display displays m lines of text of the read message, wherein each x degrees of angular displacement of the rotating switch scrolls the text of the read message by one of the m lines, and wherein a number of the m lines that are underlined corresponds to m minus an integer that is a number of degrees that the rotating switch is rotated divided by x.

9. The method of claim 8, wherein x is 24.

10. A method of operating a radio communication apparatus, comprising the steps of:

receiving a message;

storing the received message;

reading the stored message;

displaying text of the read message on a display;

scrolling the text of the read message on the display by rotating a rotating switch where an amount of the scrolled text corresponding to an angular displacement of the rotating switch;

comparing (a) a first displayed portion of the text of the read message before scrolling by the rotating switch to (b) a second displayed portion of the text of the read message after scrolling by said rotating switch; and underlining the text of the read message that is contained in the second displayed portion and not in the first displayed portion.

11. The method of claim 10, wherein the display displays m lines of text of the read message, wherein each x degrees of angular displacement of the rotating switch scrolls the text of the read message by one of the m lines, and wherein a number of the m lines that are underlined corresponds to an integer that is a number of degrees that the rotating switch is rotated divided by x.

12. The method of claim 11, wherein x is 24.

\* \* \* \* \*